3,169,881
**VIBRATION DAMPING COATING FOR
VIBRATORY STRUCTURES**
Albert G. Bodine, Jr., Sherman Oaks, Calif.
(7877 Woodley Ave., Van Nuys, Calif.)
Filed Feb. 7, 1962, Ser. No. 171,750
5 Claims. (Cl. 117—45)

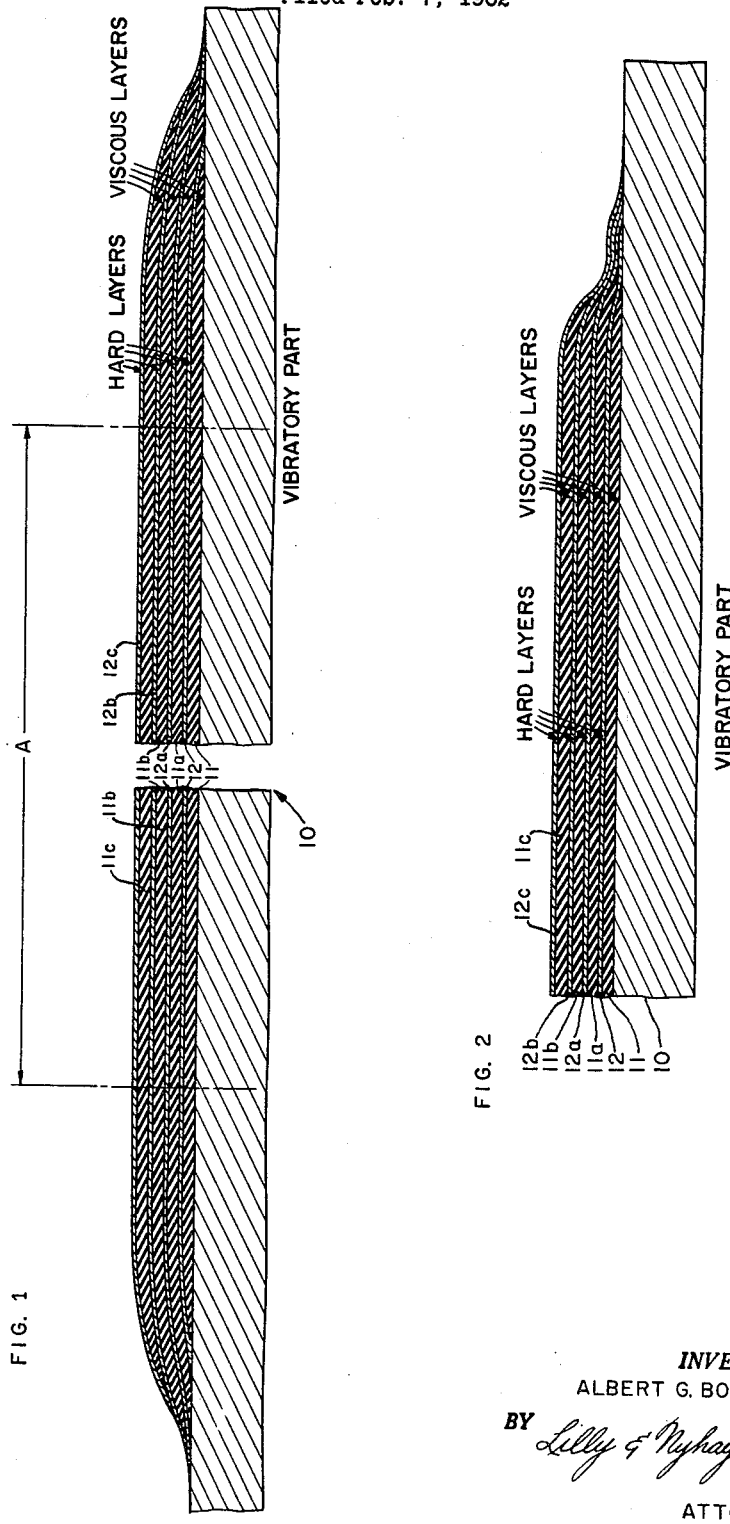

This invention relates generally to vibration damping of vibratory machine parts, walls, engine structures and the like, and deals more especially with a novel vibration damping surface coating for that purpose.

A general object of the invention may be stated to be to provide a surface coating for vibratory structures which has a strong vibration damping effect, and is at the same time cheap, easily applicable, even in the case of complex-shaped parts, and durable.

The invention comprises the use of thin alternate layers of coating or paint of two different characteristics, first, a layer of tacky, viscous material, such as a non-hardening, bituminous or asphaltic material, a rubber-based material, a large molecule hydrocarbon, etc.; and second, an overlying layer of hard and relatively rigid material, such as a hardening varnish, e.g., phenolic or epoxy varnishes, which are thermosetting in character, or set by internal reaction after application, or a painted or sprayed-on metal coating.

These alternating layers or coatings can be used in few or large numbers, depending upon the degree of vibration damping required.

Upon any vibratory flexing of the base (machine part or wall) to which these coatings have been applied, the tacky, viscous material is placed in shear, and exerts a viscous damping effect upon the vibration of the base part.

Reference is now directed to the drawings, in which:

FIG. 1 is in longitudinal section, showing an illustrative application of a multiplicity of coating layers in accordance with the invention to a vibratory base part or wall, the coating thickness being exaggerated for clarity of illustration; and FIG. 2 is a fragmentary view similar to a portion of FIG. 1, but showing a modification.

Reference numeral 10 designates generally the vibratory base part whose vibration is to be damped. It may be a vibratory metal wall or part of an engine, machine, or other device. Applied over this base part 10 is a coating layer 11 of non-hardening viscous material, such as a viscous bituminous substance, typically some of the better quality asphalt paints. This layer 11 may be painted on with a brush, applied with a roller, or deposited in any other manner desired.

Over the viscous layer 11 is applied a layer 12 of a hardening material, such as a phenolic or epoxy varnish, or a sprayed-on metallic coating such as sprayed molten copper. The material used for this layer 12 may be such that it sets up and hardens by an internal reaction. Thus it may be any of the thermosetting plastic coating materials or varnishes requiring heat for the internal "setting" reaction; and the coating, in this case, may be heated after application to induce the setting reaction to occur. This layer 12 may be applied in any suitable manner, though spray application is preferred in view of the tacky nature of the viscous undercoating 11. The layer 12 sets into a hard, rigid form, and fits intimately to the tacky layer. It is intimately keyed or locked to the tacky layer, with the consequence that any flexing of the base member results in substantial shear of the viscous tacky layer. As shown, the hard layer 12 extends beyond the periphery of the viscous layer.

Preferably, a substantial number of additional thin layers of the tacky or viscous substance and the hard and rigid substance are used alternately over the first two layers 11 and 12, being applied successively, in the same general manner as the first two layers. The viscous layers are of course applied after hardening or setting of the hard layers which they cover. The total thickness of the plurality of layers can be made quite substantial; and in fact, the total thickness can be built up, layer after layer, to any dimension found useful in any given situation. Thus, as shown in the drawings, additional viscous layers 11a, 11b, 11c, etc., alternate with additional hard and rigid layers 12a, 12b, 12c, etc. Many additional such layers may be added.

As will be observed in the drawings, each of the hard layers 12, 12a, 12b, etc., extends beyond the edges of the viscous layer immediately below it, thus sealing said edges, and either contacts the base member 10 beyond said edges, or the hard layer immediately below. As illustratively shown in FIG. 1: Hard layer 12 contacts and seals to the base member 10 beyond the edges of viscous layer 11. Viscous layer 11a contacts base member 10 beyond the edges of hard layer 12. Viscous layer 11b terminates, in this instance, short of the marginal edges of hard layer 12a. The immediately overlying hard layer 12b extends beyond the edges of viscous layer 11b, and contacts and seals to the hard layer 12a. It could, of course, be extended on to contact the surface of base 10 beyond the edges of hard layer 12a. Viscous layer 11c, in the manner of layer 11b, terminates short of the marginal edge of underlying hard layer 12b, and the outside hard layer 12c is lapped beyond the edges of viscous layer 11c, and contacts and seals to the hard layer 12b. It could, of course, be extended to contact and seal to the exposed edge portion of hard layer 12a, and even on into contact with base 10.

FIG. 2 shows a modification in which the edge portions of the hard layers 12, 12a, 12b and 12c all contact and are sealed or integrated to one another, and in which all the hard layers individually contact and are adhesively joined or sealed to the base member 10.

It will be seen that the hard layers seal the edges of the viscous layers, preventing any tendency for extrusion of the latter. In addition, and of even greater importance, the hard layers, at their edges, contact and seal to the base member, or edge portions of other hard layers, so as to be all integrated to, i.e., fixed relatively to, one another in these edge portions. Further, the region of integration of the hard layers is distantly spaced from the mid-area A of the base member 10 where the vibration that is to be quelled is taking place. Recalling also the intimate fit of the hard layers over the viscous layers, with keying or locking of the adjacent surfaces of adjacent layers to one another contributed to by inevitable local surface irregularities, it can be seen that vibratory flexing of the base member 10, particularly in the mid-region A, causes shearing of the viscous layers 11, 11a, etc., and resulting heavy damping of the vibration.

The multiple layers 12, 12a, etc., of hard material function to separate the viscous layers, permitting a large total thickness of viscous material without the thickness of any one viscous layer becoming so great that plastic flow or dislocation of the viscous material can become a problem. The total shear movement of the viscous material, and therefore the total damping, is dependent upon the relative vibratory movement between the base 10 in the mid-region A, and the outside hard layer fastened at its edges to the base 10 at locations spaced from the region A.

A broad frequency band of acoustic damping is accomplished by any one of a number of variations of my invention provided the following basic features are incorporated: (1) alternate layers of viscous paint and rigid paint in combination having the mutual keying action accomplished by a material which is applied as fluid paint; and (2), the rigid layer or layers all tightly or rigidly connected to the base structure whose vibrations are to be suppressed, across substantial spacing intervals or distances, so that large intervening expanses of rigid paint are in intimate keying or locking contact with only the substance of the viscous paint. This combination of features affords maximum shear action, and vibration damping, for a given acoustic wave motion or vibration of the base structure.

I claim:

1. Damping means for a vibratory part comprising a layer of viscous substance coated on said part and
   a layer of a hard substance coated over said viscous layer and being in intimate contact with said layer of viscous substance and extending beyond the periphery of said viscous layer, the portions of said layer of a hard substance which extend beyond the periphery of said viscous layer being fixed to said vibratory part.

2. Damping means for a vibratory part comprising a multiplicity of layers of viscous material and a multiplicity of layers of hard material coated alternately on said vibratory part, with said hard layers in intimate contact with the surfaces of adjacent viscous layers, each of said layers of hard material extending beyond the periphery of the immediately underlying viscous layer, and being fixed to said vibratory part beyond said periphery.

3. The subject matter of claim 2, wherein the portion of at least one hard layer that extends beyond the periphery of the immediately underlying viscous layer is fixed to said vibratory part by being fixed to a portion of an underlying hard layer that is adhesively applied to said vibratory part.

4. The subject matter of claim 2, wherein the portions of said hard layers that extend beyond the peripheries of the viscous layers are individually in contact with said base part.

5. The subject matter of claim 2, wherein the portions of said hard layers at corresponding edges of said hard layers are integrated directly to one another.

References Cited in the file of this patent

UNITED STATES PATENTS

| | | |
|---|---|---|
| 1,784,611 | Polanyi et al. | Dec. 9, 1930 |
| 2,184,482 | Austin et al. | Dec. 26, 1939 |
| 2,270,902 | Rubissow | Jan. 27, 1942 |
| 2,680,695 | Judd | June 8, 1954 |
| 2,736,656 | Marshall | Feb. 28, 1956 |
| 2,819,032 | Detrie et al. | Jan. 7, 1958 |
| 2,911,207 | Coble et al. | Nov. 3, 1959 |
| 2,998,342 | Waugh et al. | Aug. 29, 1961 |
| 3,007,997 | Panariti | Nov. 7, 1961 |